(12) United States Patent
Zhao et al.

(10) Patent No.: US 12,525,875 B2
(45) Date of Patent: Jan. 13, 2026

(54) VOLTAGE CONTROL METHOD AND APPARATUS, HOUSEHOLD DEVICE, COMPUTER STORAGE MEDIUM, AND COMPUTER PROGRAM

(71) Applicants: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

(72) Inventors: Ming Zhao, Foshan (CN); Zhaobin Huang, Foshan (CN); Tan Long, Foshan (CN); Xianshi Wen, Foshan (CN); Dong Wei, Foshan (CN); Zhenghui Huang, Foshan (CN)

(73) Assignees: FOSHAN SHUNDE MIDEA ELECTRIC SCIENCE AND TECHNOLOGY CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 230 days.

(21) Appl. No.: 18/287,390

(22) PCT Filed: Mar. 25, 2022

(86) PCT No.: PCT/CN2022/083163
§ 371 (c)(1),
(2) Date: Oct. 18, 2023

(87) PCT Pub. No.: WO2022/227972
PCT Pub. Date: Nov. 3, 2022

(65) Prior Publication Data
US 2024/0204656 A1 Jun. 20, 2024

(30) Foreign Application Priority Data

Apr. 26, 2021 (CN) .......................... 202110456108.1

(51) Int. Cl.
*H02M 7/06* (2006.01)
*H02M 1/12* (2006.01)
(Continued)

(52) U.S. Cl.
CPC .......... *H02M 1/4216* (2013.01); *H02M 1/12* (2013.01); *H02M 1/32* (2013.01); *H02M 7/06* (2013.01); *H02M 7/125* (2013.01)

(58) Field of Classification Search
CPC ........... H02M 1/12; H02M 1/32; H02M 1/42; H02M 1/4216; H02M 7/06; H02M 7/125
See application file for complete search history.

(56) References Cited

U.S. PATENT DOCUMENTS

| | | | | |
|---|---|---|---|---|
| 11,646,671 B1 * | 5/2023 | Teeneti | ................. | H02M 7/487 323/234 |
| 2003/0128563 A1 * | 7/2003 | Rojas Romero | .... | H02M 1/4216 363/89 |

(Continued)

FOREIGN PATENT DOCUMENTS

| CN | 1906836 A | 1/2007 |
|---|---|---|
| CN | 106160039 A | 11/2016 |

(Continued)

OTHER PUBLICATIONS

The World Intellectual Property Organization (WIPO) Written Opinion for PCT/CN2022/083163 Jun. 6, 2022 6 Pages (including translation).

(Continued)

*Primary Examiner* — Gary L Laxton
(74) *Attorney, Agent, or Firm* — Anova Law Group, PLLC

(57) ABSTRACT

A voltage control method includes obtaining two half-bus voltages at a direct current side of a three-level converter, (Continued)

overvoltage protection values of the two half-bus voltages, and a load voltage required by a load. One of the two half-bus voltages is configured to supply voltage to the load. The method further includes determining a voltage control strategy based on a relationship among the two half-bus voltages, the overvoltage protection values, and the load voltage. The voltage control strategy compensates for an output duty ratio of a switch of the three-level converter, such that the one of the two half-bus voltages is greater than or equal to the load voltage and each of the two half-bus voltages is smaller than or equal to a corresponding one of the overvoltage protection values. The method also includes performing voltage control on the two half-bus voltages based on the voltage control strategy.

20 Claims, 9 Drawing Sheets

(51) Int. Cl.
  *H02M 1/32*  (2007.01)
  *H02M 1/42*  (2007.01)
  *H02M 7/12*  (2006.01)

(56) References Cited

U.S. PATENT DOCUMENTS

| | | | |
|---|---|---|---|
| 2009/0295229 | A1 | 12/2009 | Harke |
| 2012/0257427 | A1* | 10/2012 | Fattal .................... H02M 7/219 363/84 |
| 2014/0070743 | A1* | 3/2014 | Yoshida ................ H02P 29/024 318/400.22 |
| 2015/0349654 | A1* | 12/2015 | Wang ...................... H02M 5/44 363/37 |
| 2019/0334445 | A1 | 10/2019 | Ishikawa et al. | 
| 2023/0318433 | A1* | 10/2023 | Huang ................ H02M 7/4833 307/154 |

FOREIGN PATENT DOCUMENTS

| | | | | |
|---|---|---|---|---|
| CN | 106533218 | A | 3/2017 | |
| CN | 107134839 | A | 9/2017 | |
| CN | 107147101 | A | 9/2017 | |
| CN | 107612319 | A | 1/2018 | |
| CN | 107659130 | A | 2/2018 | |
| CN | 105406698 | B | 12/2018 | |
| CN | 109494995 | A | 3/2019 | |
| CN | 111464032 | A | 7/2020 | |
| CN | 112019034 | A | 12/2020 | |
| CN | 112271700 | A | 1/2021 | |
| CN | 212305171 | U | 1/2021 | |
| CN | 114337332 | A * | 4/2022 | ............. F24F 11/88 |
| JP | H08228487 | A | 9/1996 | |

OTHER PUBLICATIONS

The European Patent Office (EPO) Extended Search Report for EP Application No. 22794445.1, Aug. 20, 2024 10 Pages.

Wenlong Ding et al., "Independent Voltage Outputs Control for Vienna Rectifier Considering Multiple Loads Situations" Jun. 3, 2017, pp. 1785-1790, 2017 IEEE 3rd International Future Energy Electronics Conference and ECCE Asia.

The World Intellectual Property Organization (WIPO) International Search Report and Written Opinion for PCT/CN2022/083163 Jun. 6, 2022 14 Pages (including translation).

Haipeng Jiang et al., "Simplified SVPWM dual closed loop vector control method for Vienna rectifier with midpoint potential balance control", Feb. 2014, pp. 35-41, vol. 18 No. 2, China Academic Journal Electronic Publishing House.

China National Intellectual Property Administration (CNIPA) Office Action 1 for 202110456108.1, Mar. 4, 2025 10 Pages (including translation).

The China National Intellectual Property Administration (CNIPA) The Notice of Decision of Granting Patent Right for Utility Model for Chinese Application 202110456108.1, Jul. 29, 2025 3 Pages (With Translation).

* cited by examiner

VOLTAGE CONTROL METHOD AND APPARATUS, HOUSEHOLD DEVICE, COMPUTER STORAGE MEDIUM, AND COMPUTER PROGRAM

CROSS-REFERENCE TO RELATED APPLICATIONS

The present application is a National Stage Entry under 35 U.S.C. § 371 of International Application No. PCT/CN2022/083163, filed on Mar. 25, 2022, which claims priority to Chinese Patent Application No. 202110456108.1 filed on Apr. 26, 2021 and entitled "VOLTAGE CONTROL METHOD AND APPARATUS, HOUSEHOLD DEVICE, COMPUTER STORAGE MEDIUM, AND COMPUTER PROGRAM," the entire disclosure of which is incorporated herein by reference.

FIELD

The present disclosure relates to the field of power supply control, and in particular, to a voltage control method and apparatus, a household device, a computer storage medium, and a computer program.

BACKGROUND

At present, the power factor correction (PFC) technology has been widely applied. In the related art, a control scheme of a three-level three-phase active PFC circuit usually controls half-bus voltages by using midpoint balance control that makes equal an upper half-bus voltage and a lower half-bus voltage. However, in this control scheme, when one of the half-bus voltages has a load, it results in great positive/negative deviations in an output duty ratio, leading to great imbalance in a waveform of each of a positive half side and a negative half side of an input current. Moreover, current harmonics are increased to some extent.

SUMMARY

Embodiments of the present disclosure provide a voltage control method and apparatus, a household device, a computer storage medium, and a computer program, which can solve the problems of significant unbalance in the waveform of each of the positive and negative half sides of the input current and excessive current harmonics in the related art.

The embodiments of the present disclosure provide a voltage control method applied in a voltage control apparatus. The voltage control apparatus is applied in a power factor correction (PFC) circuit including a three-level converter. The voltage control method includes: obtaining two half-bus voltages at a direct current side of the three-level converter, overvoltage protection values of the two half-bus voltages, and a voltage required by a first load, the first load representing a load of which a supply voltage is either one of the two half-bus voltages; determining a voltage control strategy based on a relationship among the two half-bus voltages, the overvoltage protection values, and the voltage required by the first load, wherein the voltage control strategy is used to compensate for an output duty ratio of each of switches of the three-level converter, allowing a first half-bus voltage of the two half-bus voltages to be greater than or equal to the voltage required by the first load and allowing each of the two half-bus voltages to be smaller than or equal to the overvoltage protection value, and the first half-bus voltage represents a half-bus voltage for supplying power to the first load; and performing voltage control on the two half-bus voltages based on the voltage control strategy.

In some embodiments, determining the voltage control strategy based on the relationship among the two half-bus voltages, the overvoltage protection values, and the voltage required by the first load includes: determining a compensation amount of an output duty ratio based on the relationship among the two half-bus voltages, the overvoltage protection values, and the voltage required by the first load; and compensating for a current output duty ratio of each of the switches with the compensation amount of the output duty ratio.

In some embodiments, determining the compensation amount of the output duty ratio based on the relationship among the two half-bus voltages, the overvoltage protection values, and the voltage required by the first load includes: determining a control amount of the two half-bus voltages based on the relationship among the two half-bus voltages, the overvoltage protection values, and the voltage required by the first load; and obtaining the compensation amount of the output duty ratio by performing proportional integral (PI) control on the control amount of the two half-bus voltages.

In some embodiments, determining the control amount of the two half-bus voltages based on the relationship among the two half-bus voltages, the overvoltage protection values, and the voltage required by the first load includes: obtaining a determination result by determining, in response to determination that each of the two half-bus voltages is smaller than or equal to the corresponding one of the overvoltage protection values, a magnitude relationship between the first half-bus voltage and the voltage required by the first load; and determining the control amount of the two half-bus voltages based on the determination result.

In some embodiments, determining the control amount of the two half-bus voltages based on the determination result includes: determining, in response to determination that the first half-bus voltage is smaller than the voltage required by the first load, the control amount of the two half-bus voltages to be a difference value derived by subtracting the first half-bus voltage from the voltage required by the first load; and determining, in response to determination that the first half-bus voltage is greater than or equal to the voltage required by the first load, the control amount of the two half-bus voltages to be zero.

In some embodiments, determining the control amount of the two half-bus voltages based on the relationship among the two half-bus voltages, the overvoltage protection values, and the voltage required by the first load further includes: determining, in response to determination that the first half-bus voltage is smaller than or equal to the overvoltage protection value and a second half-bus voltage of the two half-bus voltages is greater than the overvoltage protection value, the control amount of the two half-bus voltages to be a difference value derived by subtracting the overvoltage protection value from the second half-bus voltage, the second half-bus voltage representing another half-bus voltage of the two half-bus voltages other than the first half-bus voltage.

In some embodiments, determining the control amount of the two half-bus voltages based on the relationship among the two half-bus voltages, the overvoltage protection values, and the voltage required by the first load further includes: determining, in response to determination that the first half-bus voltage is greater than the overvoltage protection value and a second half-bus voltage of the two half-bus voltages is smaller than or equal to the overvoltage protection value, the control amount of the two half-bus voltages to be a difference value derived by subtracting the first half-bus voltage from the overvoltage protection value, the second half-bus voltage representing another half-bus voltage of the two half-bus voltages other than the first half-bus voltage.

In some embodiments, determining the control amount of the two half-bus voltages based on the relationship among the two half-bus voltages, the overvoltage protection values, and the voltage required by the first load further includes: determining, in response to determination that the two half-bus voltages are both greater than the overvoltage protection values, the control amount of the two half-bus voltages to be a difference value derived by subtracting the first half-bus voltage from the second half-bus voltage, the second half-bus voltage representing another half-bus voltage of the two half-bus voltages other than the first half-bus voltage.

In some embodiments, the overvoltage protection values are smaller than or equal to a withstand voltage value of a capacitor at the direct current side of the three-level converter.

The embodiments of the present disclosure further provide a voltage control apparatus, which includes a memory, a processor, and a computer program stored on the memory and executable by the processor. The processor is configured to implement, when executing the program, any one of the voltage control methods as described above.

The embodiments of the present disclosure further provide a household device including the voltage control apparatus as described above and a second load. The voltage control apparatus is accessed between an alternating-current power supply signal and the second load, and is configured to control the alternating-current power supply signal to supply power to the second load.

The embodiments of the present disclosure further provide a computer storage medium having at least one program stored thereon. The at least one program is executable by at least one processor to implement any one of the voltage control methods as described above.

The embodiments of the present disclosure further provide a computer program including a computer-readable code. When the computer-readable code runs on a voltage control apparatus, a processor of the voltage control apparatus performs any one of the voltage control methods as described above.

The embodiments of the present disclosure provide a voltage control method and apparatus, a household device, a computer storage medium, and a computer program. The voltage control method includes: obtaining two half-bus voltages at a direct current side of the three-level converter, overvoltage protection values of the two half-bus voltages, and a voltage required by a first load, the first load representing a load of which a supply voltage is one of the two half-bus voltages; determining a voltage control strategy based on a relationship among the two half-bus voltages, the overvoltage protection values, and the voltage required by the first load, wherein the voltage control strategy is used to compensate for an output duty ratio of each of switches of the three-level converter, allowing a first half-bus voltage of the two half-bus voltages to be greater than or equal to the voltage required by the first load and allowing each of the two half-bus voltages to be smaller than or equal to the overvoltage protection value, and the first half-bus voltage represents a half-bus voltage for supplying power to the first load; and performing voltage control on the two half-bus voltages based on the voltage control strategy.

It is evident that the embodiments of the present disclosure allow for adjustment on the two half-bus voltages based on the overvoltage protection values and the voltage required by the first load, to define a normal variation range of the two half-bus voltages, which is advantageous for ensuring normal operation of the load. Since there is no need to perform control of half-bus voltages by using midpoint balance control that makes an upper half-bus voltage and a lower half-bus voltage are equal, the problems of significant unbalance in the waveform of each of the positive and negative half sides of the input current can be alleviated to some extent. Moreover, it is possible to improve the current harmonics and enhance stability of the PFC circuit.

It should be understood that the above general description and the following detailed description are only exemplary and explanatory, and not intended to limit the present disclosure.

BRIEF DESCRIPTION OF THE DRAWINGS

The accompanying drawings, which are incorporated in and constitute part of this specification, illustrate embodiments consistent with the present disclosure and are used in conjunction with the specification to explain the technical solutions of the present disclosure.

DETAILED DESCRIPTION

Technical solutions according to embodiments of the present disclosure will be described below clearly and completely in combination with accompanying drawings of the embodiments of the present disclosure.

The embodiments of the present disclosure may be applied in a PFC circuit, which may be used for providing power to a load of a household device. The household device herein may be a powered device, such as a refrigerator, an air conditioner, and an electric cooker. The PFC circuit may be, for example, a three-phase active PFC circuit.

Figure 1A:
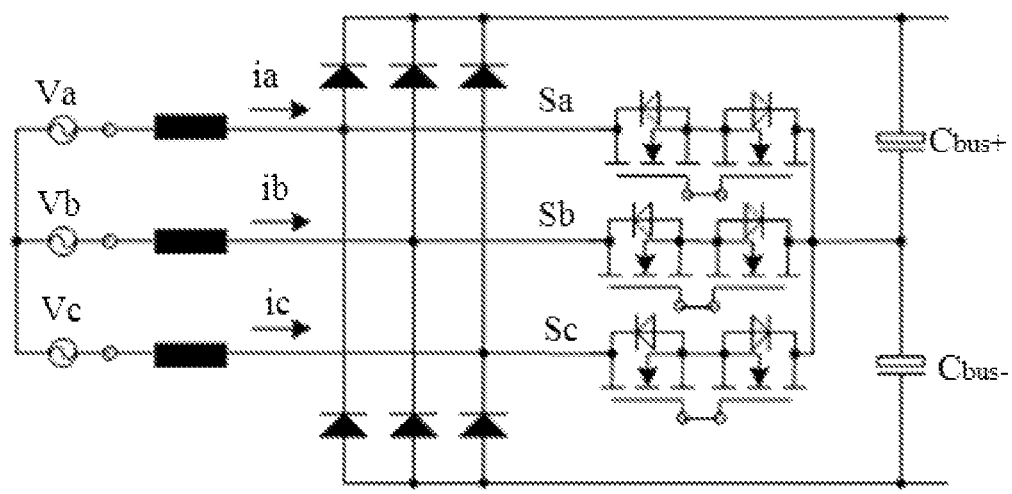
FIG. 1A is a schematic diagram of a topology structure of a three-phase active PFC circuit according to an embodiment of the present disclosure.
Figure 1B:
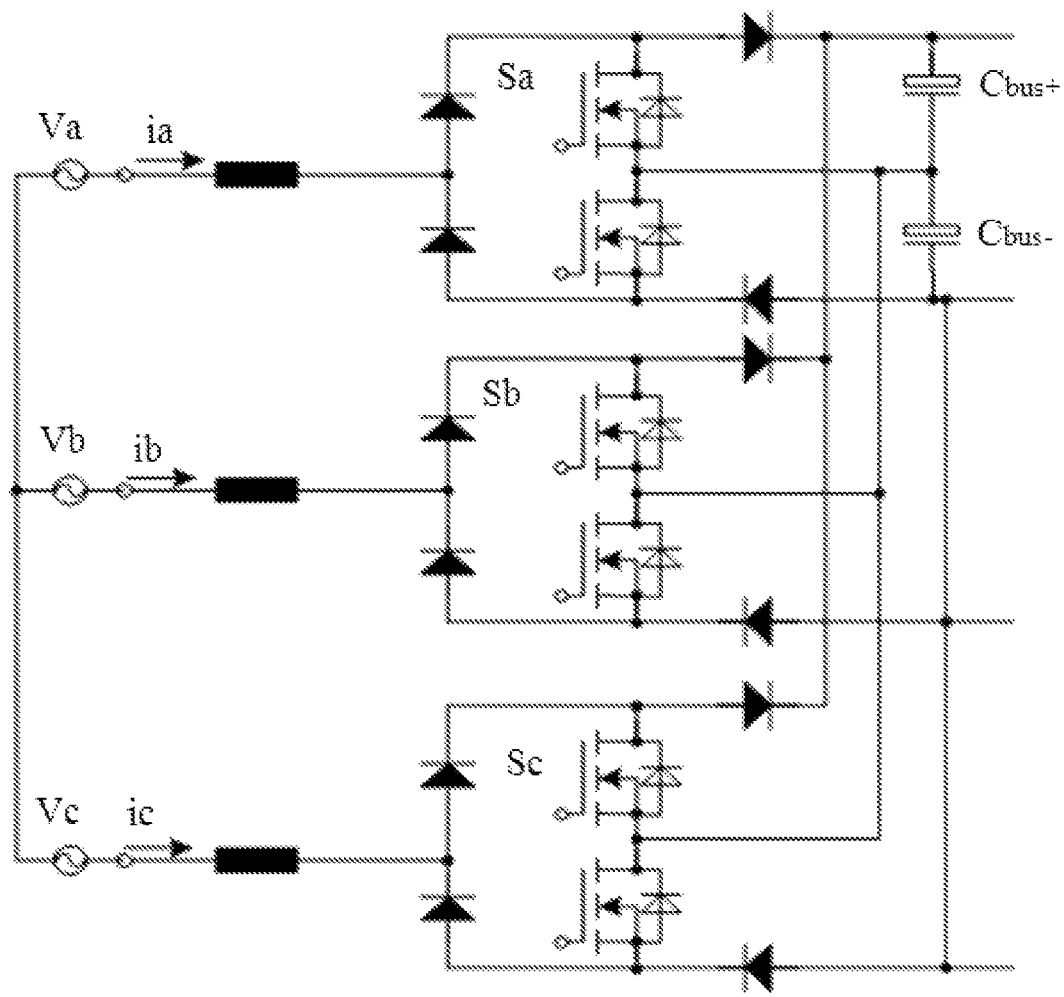
FIG. 1B is a schematic diagram of another topology structure of a three-phase active PFC circuit according to an embodiment of the present disclosure.

FIG. 1A and FIG. 1B are schematic diagrams of two topology structures of the three-phase active PFC circuit according to an embodiment of the present disclosure. Referring to FIG. 1A and FIG. 1B, Va, Vb and Vc respectively represent input voltages of a three-phase alternating current, and ia, ib and ic respectively represent three-phase input currents. The three-phase alternating current represents three electrical signals with the same frequency, the same potential amplitude, and a phase difference of 120° from one another.

In embodiments of the present disclosure, the three-phase input currents ia, ib and ic can be rectified by a three-level converter. Referring to FIG. 1A and FIG. 1B, the three-level converter may include three bidirectional-conduction power switch combinations Sa, Sb, and Sc. Sa, Sb and Sc represent the power switch combinations corresponding to ia, ib, and ic, respectively. In an embodiment, a power switch of the power switch combination may be a metal-oxide-semiconductor field-effect transistor (MOS) device or an insulated gate bipolar transistors (IGBT) device of a silicon (Si) material, an MOS device of a silicon carbide (SiC) material, or an MOS device of a gallium nitride (GaN) material, which is not limited in the embodiments of the present disclosure.

Figure 2A:
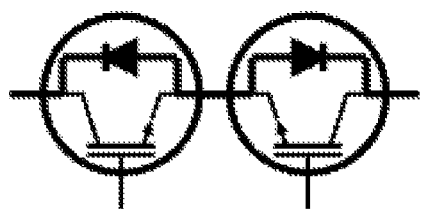
FIG. 2A is a schematic diagram of a combination form of power switches according to an embodiment of the present disclosure.
Figure 2B:
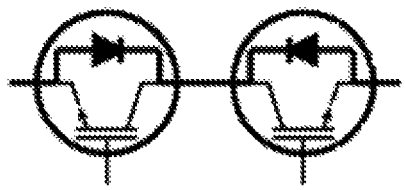
FIG. 2B is a schematic diagram of another combination form of power switches according to an embodiment of the present disclosure.
Figure 2C:
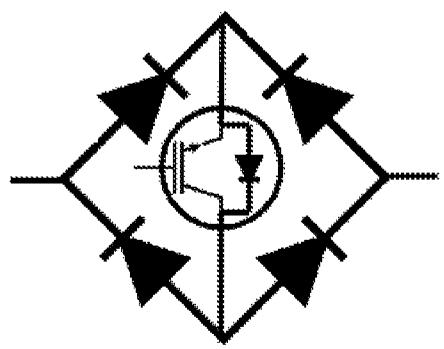
FIG. 2C is a schematic diagram of yet another combination form of power switches according to an embodiment of the present disclosure.

Exemplarily, a combination form of the power switches may be in a form illustrated in FIG. 1A and FIG. 1B or a combination form illustrated in FIG. 2A to FIG. 2C. FIG. 2A is a schematic diagram of a combination of power switches according to an embodiment of the present disclosure. FIG. 2B is a schematic diagram of another combination of power switches according to an embodiment of the present disclosure. FIG. 2C is a schematic diagram of yet another combination of power switches according to an embodiment of the present disclosure. The embodiments of the present disclosure are not limited thereto.

In an embodiment of the present disclosure, two half-bus voltages at a direct current side of the three-level converter include an upper half-bus voltage and a lower half-bus voltage. Referring to FIG. 1A and FIG. 1B, a first capacitor Cbus+ at the direct current side of the three-level converter is an upper half-bus capacitor, and a voltage across two ends of the first capacitor Cbus+ is the upper half-bus voltage. Moreover, a second capacitor Cbus− at the direct current side of the three-level converter is a lower half-bus capacitor, and a voltage across two ends of the second capacitor Cbus− is the lower half-bus voltage.

A voltage across two ends of a branch consisting of the first capacitor Cbus+ and the second capacitor Cbus− is a full-bus voltage, which may be briefly referred to as a bus voltage. In an embodiment, the upper half-bus voltage or the lower half-bus voltage is half of the bus voltage. It can be understood that the remaining unknown voltage value can be obtained based on two known voltage values of the upper half-bus voltage, the lower half-bus voltage, and the bus voltage.

In an embodiment, the first capacitor Cbus+ and the second capacitor Cbus− may be electrolytic capacitors or other types of capacitors.

It can be understood by those skilled in the art that the bus voltage, the upper half-bus voltage and the lower half-bus voltage may be regarded as supply voltages for the load. In some embodiments, a power supply signal is an alternating-current power supply signal from the utility grid. In other embodiments, referring to FIG. 1A and FIG. 1B, the power supply signal is a direct-current power supply signal that has been rectified by the three-level converter.

In the related art, the three-phase active PFC circuit usually controls the half-bus voltages by using midpoint balance control that makes the upper half-bus voltage equal to the lower half-bus voltage. However, this solution may cause an output duty ratio to generate great positive and negative deviations, which allows a waveform of each of positive and negative half sides of an input current to be dramatically unbalanced, affecting stability of the three-phase active PFC circuit and increasing current harmonics. In addition, this solution may also further aggravate the power imbalance condition of the upper half-bus capacitor and the lower half-bus capacitor.

Concerning the above technical problems, the present disclosure will be described in detail below with reference to the accompanying drawings and embodiments. It should be understood that the embodiments provided herein are only used to explain the present disclosure, instead of limiting the present disclosure. In addition, the embodiments provided below are used to partially implement the embodiments of the present disclosure, other than providing all embodiments of the present disclosure. The technical solutions described in the present disclosure can be combined arbitrarily without mutual contradiction.

It should be noted that, in the present disclosure, terms "comprise," "include" or any other variations thereof are intended to cover non-exclusive including, such that the method or apparatus including a series of elements does not only include those elements, but also include other elements that are not explicitly listed, or also include inherent elements of the implementation method or apparatus. In a case that there is no more restriction, an element defined by the statement "includes a . . . " does not exclude the presence of additional identical elements (for example, a step in a method or a unit in an apparatus, like the unit in the apparatus may be a part of a processor, a part of a program, or software) in the method or apparatus that includes the element.

In the present disclosure, the term "and/or" only represents a relationship between correlated objects, including three relationships. For example, "A and/or B" may represent three situations, i.e., A alone, B alone, or both A and B. In addition, the term "at least one" in the present disclosure represents any combination of at least two of any one or more of various elements, for example, including at least one of A, B, or C, which may represent one or more elements selected from a group consisting of A, B, and C.

For example, a voltage control method provided in the embodiments of the present disclosure includes a series of steps, but is not limited to the described steps. Similarly, a voltage control apparatus provided in the embodiments of the present disclosure includes a series of modules. However, the voltage control apparatus provided in the embodiments of the present disclosure includes explicitly described modules, and may further include modules that need to be configured to obtain related information or perform processing based on information.

The embodiments of the present disclosure may be realized based on the voltage control apparatus, and the voltage control apparatus may include a program module for executing instructions of a computer system. The computer system may be implemented in a distributed cloud computing environment. In the distributed cloud computing environment, the program module may be located on a local or remote computing system storage medium that includes a storage device.

Figure 3:
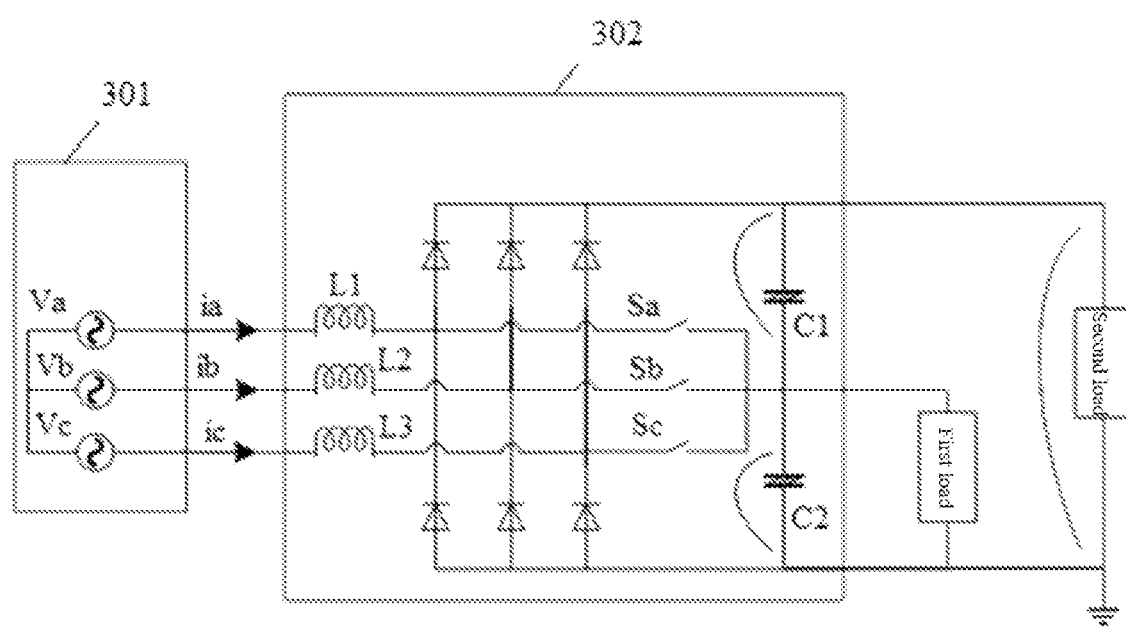
FIG. 3 is a schematic diagram of an optional structure of a three-phase active PFC circuit according to an embodiment of the present disclosure.

The embodiments of the present disclosure provide a voltage control method, which may be applied in a PFC circuit. In a case where the PFC circuit is the three-phase active PFC circuit, the three-phase active PFC circuit in this embodiment of the present disclosure is described in combination with FIG. 3. FIG. 3 is a schematic diagram of an optional structure of a three-phase active PFC circuit according to an embodiment of the present disclosure. Referring to FIG. 3, the three-phase active PFC circuit may include an input power supply module 301, a three-phase three-level rectifier module 302, a first load, and a second load.

The input power supply module 301 is configured to input a three-phase current to the three-phase three-level rectifier module 302. In FIG. 3, the meanings of Va, Vb, Vc, ia, ib and ic have been described in the foregoing disclosure.

In an embodiment, the three-phase three-level rectifier module 302 may be a T-type three-level converter. A topology structure of the three-phase three-level rectifier module 302 may be Vienna topology, and the three-phase three-level rectifier module 302 is configured to convert an alternating-current signal into a direct-current signal. The three-phase three-level rectifier module 302 further includes a first inductor L1, a second inductor L2, and a third inductor L3.

In the three-phase three-level rectifier module 302, a third capacitor C1 is an upper half-bus capacitor, a fourth capacitor C2 is a lower half-bus capacitor. A voltage across two ends of the third capacitor C1 is an upper half-bus voltage Vbus_p, and a voltage across two ends of the fourth capacitor C2 is a lower half bus-voltage Vbus_n.

A supply voltage of the first load is the lower half-bus voltage Vbus_n, i.e., the first load is a half-bus voltage load. A supply voltage of the second load is a bus voltage V0, i.e., the second load is a full-bus voltage load.

It should be noted that in an actual condition, the first load or the second load may be an optional load. That is, in an embodiment, a load of the three-phase active PFC circuit includes the first load and the second load, or is the first load or the second load.

In an embodiment, the three-phase active PFC circuit illustrated in FIG. 3 may further include a voltage and current collection module (not illustrated in FIG. 3). In an implementation, the voltage and current collection module is configured to collect input currents of at least two phases, at least two branches of input phase voltages or line voltages, and at least two bus voltages (i.e., at least two of the bus voltage, the upper half-bus voltage, and the lower half-bus voltage). In another implementation, the voltage and current collection module is configured to collect a three-phase input current, a three-way input phase voltage, a bus voltage, an upper half-bus voltage, and a lower half-bus voltage.

It should be noted that the circuit structures illustrated in FIG. 1A, FIG. 1B and FIG. 3 are merely exemplary circuit structures in the embodiments of the present disclosure, and applications of the voltage control method in the embodiments of the present disclosure is not limited to the circuit structures illustrated in FIG. 1A, FIG. 1B, and FIG. 3.

In the embodiments of the present disclosure, an execution body of the voltage control method may be a voltage control apparatus. The voltage control method may be performed by a processor of the voltage control apparatus. The above processors can be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor.

Figure 4:
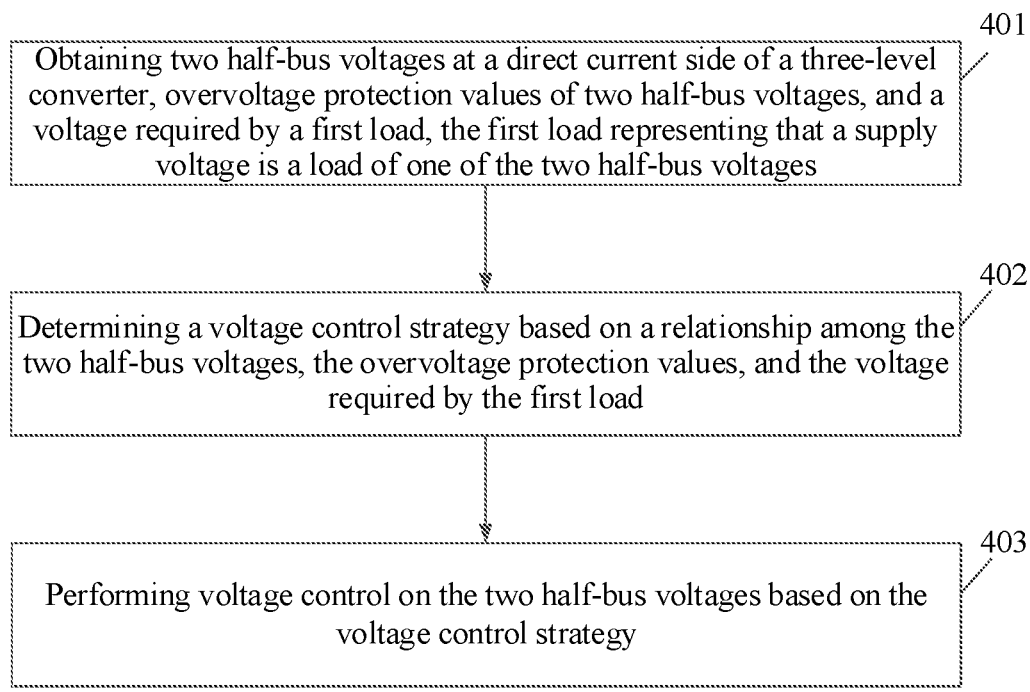
FIG. 4 is a flowchart of a voltage control method according to an embodiment of the present disclosure.

FIG. 4 is a flowchart of a voltage control method according to an embodiment of the present disclosure. The voltage control method may be applied in the PFC circuit. As illustrated in FIG. 4, the process includes actions at processes 401 to 403.

At process 401, two half-bus voltages at a direct current side of the three-level converter, overvoltage protection values of the two half-bus voltages, and a voltage required by a first load are obtained. The first load represents a load of which a supply voltage is one of the two half-bus voltages.

In this embodiment of the present disclosure, the two half-bus voltages at the direct current side of the three-level converter include the upper half-bus voltage and the lower half-bus voltage. In an example, the two half-bus voltages at the direct current side of the three-level converter is obtained through voltage detection.

Exemplarily, the overvoltage protection values of the two half-bus voltages represent upper limits that the two half-bus voltages are allowed to reach, and may be set based on actual requirements.

Exemplarily, the overvoltage protection values of the two half-bus voltages may be the same or different.

In an embodiment of the present disclosure, the first load represents a load when the supply voltage is the upper half-bus voltage or the lower half-bus voltage. For example, the first load may be the first load in FIG. 3.

In an embodiment of the present disclosure, the voltage required by the first load represents a minimum supply voltage required to drive the first load to operate normally. The voltage required by the first load may be obtained from an operating parameter of the first load, and the operating parameter of the first load may be a predetermined parameter. For example, the voltage required by the first load is 50 V or 60 V.

At process 402, a voltage control strategy is determined based on a relationship among the two half-bus voltages, the overvoltage protection values, and the voltage required by the first load.

The voltage control strategy is used to compensate for an output duty ratio of each of switches of the three-level converter, allowing a first half-bus voltage of the two half-bus voltages to be greater than or equal to the voltage required by the first load and allowing each of the two half-bus voltages to be smaller than or equal to the overvoltage protection value. The first half-bus voltage represents a half-bus voltage for supplying power to the first load.

In this embodiment of the present disclosure, the output duty ratio of the switch represents a ratio of a turn-on duration of the switch to a total duration in one pulse cycle.

In an embodiment, when the overvoltage protection values of the two half-bus voltages are the same, the voltage control strategy is configured to compensate for the output duty ratio of each of the switches of the three-level converter, allowing each of the two half-bus voltages to be smaller than or equal to a common overvoltage protection value.

In an embodiment, when the overvoltage protection values of the two half-bus voltages are different, the voltage control strategy is configured to compensate for the output duty ratio of each of the switches of the three-level converter, allowing each of the two half-bus voltages to be smaller than or equal to a corresponding one of the overvoltage protection values.

In an embodiment, the overvoltage protection values are smaller than or equal to a withstand voltage value of a capacitor at the direct current side of the three-level converter. Exemplarily, when the capacitance at the direct current side of the three-level converter is an electrolytic capacitor, a predetermined margin may be subtracted based on the withstand voltage value of the electrolytic capacitor. For example, when the withstand voltage value of the capacitor at the direct current side of the three-level converter is 450 V, the overvoltage protection values may be (450-N) V, where N is a positive number between 0 and 100.

It can be understood that, when the overvoltage protection values are smaller than or equal to the withstand voltage value of the capacitor at the direct current side of the three-level converter, the voltage control strategy performs control of the half-bus voltages, which can make the half-bus voltages smaller than or equal to the withstand voltage value of the capacitor at the direct current side of the three-level converter, allowing the capacitor at the direct current side of the three-level converter to be in a normal operation state.

In an embodiment of the present disclosure, the two half-bus voltages may be adjusted based on the overvoltage protection values and the voltage required by the first load, to define a normal variation range of the two half-bus voltages. As long as the two half-bus voltages are within the normal variation range, the operation state of the load can be improved. In an example, the adjustment of the two half-bus voltages can be realized by adjusting the output duty ratio of each of the switches.

At process 403, voltage control is performed on the two half-bus voltages based on the voltage control strategy.

In the voltage control method of the embodiments of the present disclosure, the two half-bus voltages at the direct current side of the three-level converter, the overvoltage protection values of the two half-bus voltages, the voltage required by the first load and a voltage required by a full-bus load are obtained firstly. The voltage control strategy is then determined. The voltage control strategy is used for compensating for the output duty ratio of each of the switches of the three-level converter, allowing the full-bus voltage load to be satisfied (i.e., the full-bus voltage is greater than or equal to the full-bus voltage load), allowing the first half-bus voltage to be greater than or equal to the voltage required by the first load, and allowing each of the two half-bus voltages to be smaller than or equal to the corresponding one of the overvoltage protection values. The voltage control is finally performed on the two half-bus voltages based on the voltage control strategy. In the embodiments of the present disclosure, the two half-bus voltages can be adjusted based on the overvoltage protection values and the voltage required by the first load, to define the normal variation range of the two half-bus voltages, which facilitates improvement in the operation state of the load. Since the control of the half-bus voltages is not required to be performed by using the midpoint balance control that makes the upper half-bus voltage equal to the lower half-bus voltage, the problem of significant imbalance of the waveforms of the positive and negative half sides of the input current can be alleviated to some extent. Moreover, it is possible to improve the current harmonics and relieve the power imbalance condition of the upper half-bus capacitor and the lower half-bus capacitor. Therefore, the stability of the PFC circuit is enhanced.

In an embodiment, the determining the voltage control strategy based on the relationship among the two half-bus voltages, the overvoltage protection values, and the voltage required by the first load may include: determining a compensation amount of an output duty ratio based on the relationship among the two half-bus voltages, the overvoltage protection values, and the voltage required by the first load; and compensating for a current output duty ratio of each of the switches with the compensation amount of the output duty ratio.

In this embodiment of the present disclosure, an initial value of the output duty ratio of the switch may be predetermined as desired. After the initial value of the output duty ratio of the switch is determined, the current output duty ratio of the switch may be continuously adjusted on the basis of the compensation amount of the output duty ratio until the first half-bus voltage is greater than or equal to the voltage required by the first load and each of the two half-bus voltages is smaller than or equal to the corresponding one of the overvoltage protection values.

In an implementation, the compensation amount of the output duty ratio may be a positive value or a negative value. In an implementation, when determining the compensation amount of the output duty ratio, the compensation amount of the output duty ratio may be summed with the current output duty ratio of the switch, to adjust the output duty ratio of the switch.

It can be understood that, based on the relationship among the two half-bus voltages, the overvoltage protection values, and the voltage required by the first load, the compensation amount of the output duty ratio is determined, and then the current output duty ratio of the switch is compensated for. Therefore, the current output duty ratio of the switch is compensated for, which is beneficial to allow the first half-bus voltage to be greater than or equal to the voltage required by the first load and allow each of the two half-bus voltages to be smaller than or equal to the corresponding one of the overvoltage protection values.

An implementation flow of the voltage control method in the embodiments of the present disclosure is described below with reference to FIG. 5.

Figure 5:
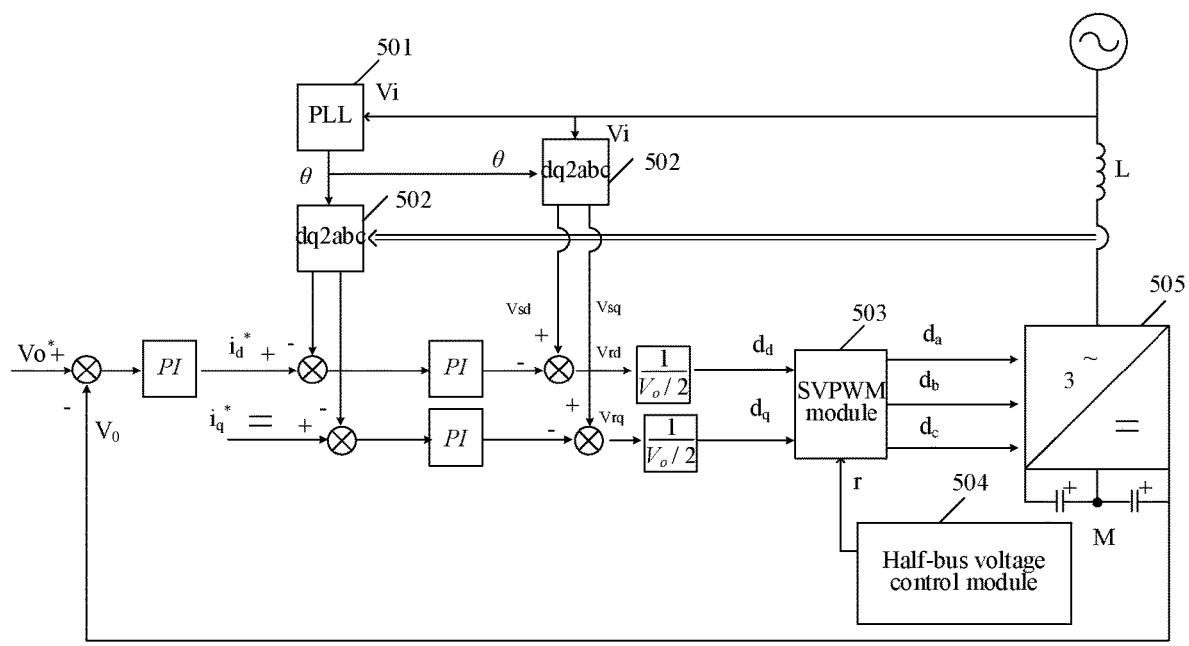
FIG. 5 is a schematic diagram of a control model of a three-phase three-level rectifier module according to an embodiment of the present disclosure.

FIG. 5 is a schematic diagram of a control model of a three-phase three-level rectifier module according to an embodiment of the present disclosure. Referring to FIG. 5, inputs to the control model of the three-phase three-level rectifier module include an upper half-bus voltage Vbus_p, a lower half-bus voltage Vbus_n, a full-bus voltage V0, an input voltage Vi (including Va, Vb, and Vc) of the three-phase alternating current, and an input three-phase current (i.e., ia, ib, and ic).

Referring to FIG. 5, the control model of the three-phase three-level rectifier module includes a phase locked loop (PLL) 501, and the PLL 501 is configured to obtain a voltage phase based on the input voltage of the three-phase alternating current. The voltage phase is used to be input to a coordinate transformation module (dq2abc) 502 of the control model of the three-phase three-level rectifier module.

The dq2abc 502 is configured to convert a current or voltage in a three-phase static coordinate system into a current or voltage in a dynamic coordinate system based on the voltage phase.

The control model of the three-phase three-level rectifier module may further include a voltage loop. Referring to FIG. 5, the voltage loop outputs a current instruction id* to a current loop through a proportion integral (PI) controller based on a target full-bus voltage V0* and an inputted actual full-bus voltage V0.

The control model of the three-phase three-level rectifier module may further include the current loop. Referring to FIG. 5, the current loop is configured to perform PI control based on the current instruction id*, a current instruction iq*, and a current (including id and iq) outputted by the dq2abc 502 under the dynamic coordinate system. An output result obtained after performing the PI control is decoupled based on a voltage (including Vsd and Vsq) outputted by the dq2abc 502 under the dynamic coordinate system, to obtain voltage instructions Vrd and Vrq. Duty ratios dd and dq in a moving coordinate system are then calculated based on the voltage instructions Vrd and Vrq and the inputted actual full-bus voltage V0, and the duty ratios dd and dq in the moving coordinate system are outputted to a space vector pulse width modulation (SVPWM) module 503.

In an embodiment, the current instruction iq* is a predetermined constant value. For example, the current instruction iq* is zero.

Referring to FIG. 5, the SVPWM module 503 is configured to convert the duty ratios dd and dq in the moving coordinate system into three-phase output duty ratios based on a predetermined three-level space vector algorithm, and compensate for each of the converted three-phase output duty ratios based on a compensation amount r of an output duty ratio outputted by a half-bus voltage control module 504, to obtain output duty ratios da, db, and dc that are finally used to be outputted to a switch 505.

Referring to FIG. 5, the half-bus voltage control module 504 is configured to generate the compensation amount r of the output duty ratio according to the method described in the foregoing embodiments.

In an embodiment, determining the compensation amount of the output duty ratio based on the relationship among the two half-bus voltages, the overvoltage protection values, and the voltage required by the first load includes: determining a control amount of the two half-bus voltages based on the relationship among the two half-bus voltages, the overvoltage protection values, and the voltage required by the first load; and obtaining the compensation amount of the output duty ratio by performing proportional integral (PI) control on the control amount of the two half-bus voltages.

In this embodiment of the present disclosure, the control amount of the half-bus voltages may be a voltage value. The voltage value may be converted into the compensation amount of the output duty ratio by performing the PI control on the control amount of the half-bus voltages.

It can be understood that the duty ratio compensation amount can be easily obtained by performing the PI control on the control amount of the half-bus voltages.

Figure 6:
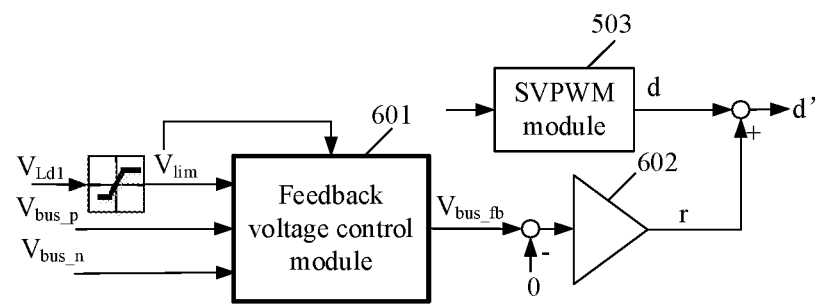
FIG. 6 is a flowchart of compensating for an output duty ratio of each of switches according to an embodiment of the present disclosure.

FIG. 6 is a flowchart of compensating for an output duty ratio of a switch according to an embodiment of the present disclosure. Referring to FIG. 6, inputs of a feedback voltage control module 601 include a voltage VLd1 required by the first load, the upper half-bus voltage Vbus_p, the lower half-bus voltage Vbus_n, and an overvoltage protection value Vlim of the two half-bus voltages.

The feedback voltage control module 601 is configured to obtain a control amount Vbus_fb of the half-bus voltages based on the inputs.

An input of a duty ratio compensation controller 602 includes the control amount Vbus_fb of the half-bus voltages. The duty ratio compensation controller 602 is configured to perform the PI control on the control amount Vbus_fb of the half-bus voltages to obtain the compensation amount r of the output duty ratio. The compensation amount r of the output duty ratio is used to compensate for an output duty ratio d of the SVPWM module 503, to obtain a compensated output duty ratio d' that may include the output duty ratios da, db, and dc. In practical applications, the output duty ratio d of the SVPWM module 503 is continuously compensated for by the process illustrated in FIG. 6, allowing the control amount Vbus_fb of the half-bus voltages to approach zero.

In an embodiment, the determining the control amount of the two half-bus voltages based on the relationship among the two half-bus voltages, the overvoltage protection values, and the voltage required by the first load may include: obtaining a determination result by determining, in response to determination that each of the two half-bus voltages is smaller than or equal to the corresponding one of the overvoltage protection values, a magnitude relationship between the first half-bus voltage and the voltage required by the first load; and determining the control amount of the two half-bus voltages based on the determination result.

It can be understood in this embodiment of the present disclosure that, when each of the two half-bus voltages is smaller than or equal to the corresponding one of the overvoltage protection values, the control amount of the half-bus voltages is determined by determining the magnitude relationship between the first half-bus voltage and the voltage required by the first load based on the determination result. That is, the control amount of the corresponding half-bus voltage can be determined based on the magnitude relationship between the first half-bus voltage and the voltage required by the first load according to the embodiment of the present disclosure, and then the output duty ratio of the switch is accurately compensated for, which is helpful to achieve the voltage control strategy.

In an embodiment, the determining the control amount of the two half-bus voltages based on the determination result may include: determining, in response to determination that the first half-bus voltage is smaller than the voltage required by the first load, the control amount of the two half-bus voltages to be a difference value derived by subtracting the first half-bus voltage from the voltage required by the first load; and determining, in response to determination that the first half-bus voltage is greater than or equal to the voltage required by the first load, the control amount of the two half-bus voltages to be zero.

It can be understood that when the first half-bus voltage is smaller than the voltage required by the first load, the control amount of the half-bus voltages is determined to be the difference value derived by subtracting the first half-bus voltage from the voltage required by the first load, which is beneficial to increase the output duty ratio of each of the switches, further facilitating to allow the first half-bus voltage to be greater than or equal to the voltage required by the first load, i.e., facilitating the realization of the voltage control strategy.

When the two half-bus voltages are both smaller than or equal to the overvoltage protection values and the first half-bus voltage is greater than or equal to the voltage required by the first load, it is indicated that the two half-bus voltages meet the requirements of the voltage control strategy. In this case, the output duty ratio of each of the switches can be kept unchanged by determining the control amount of the half-bus voltages to be zero, which can realize the voltage control strategy.

In an embodiment, the determining the control amount of the two half-bus voltages based on the relationship among the two half-bus voltages, the overvoltage protection values, and the voltage required by the first load may further include: determining, in response to determination that the first half-bus voltage is smaller than or equal to the overvoltage protection value and a second half-bus voltage of the two half-bus voltages is greater than the overvoltage protection value, the control amount of the two half-bus voltages to be a difference value derived by subtracting the overvoltage protection value from the second half-bus voltage, the second half-bus voltage representing another half-bus voltage of the two half-bus voltages other than the first half-bus voltage.

In an embodiment, the determining the control amount of the two half-bus voltages based on the relationship among the two half-bus voltages, the overvoltage protection values, and the voltage required by the first load may further include: determining, in response to determination that the first half-bus voltage is greater than the overvoltage protection value and a second half-bus voltage of the two half-bus voltages is smaller than or equal to the overvoltage protection value, the control amount of the two half-bus voltages to be a difference value derived by subtracting the first half-bus voltage from the overvoltage protection value.

It can be understood that when the first half-bus voltage is greater than or equal to the overvoltage protection value, it is indicated that the first half-bus voltage does not satisfy the requirements of the voltage control strategy. In this case, the control amount of the half-bus voltages is determined to be the difference value derived by subtracting the half-bus voltage for supplying power to the first load from the overvoltage protection value, which facilitates reduction in the output duty ratio of the switch, further facilitating to allow the first half-bus voltage to be smaller than the overvoltage protection value, i.e., facilitating the implementation of the voltage control strategy.

In an embodiment, the determining the control amount of the two half-bus voltages based on the relationship among the two half-bus voltages, the overvoltage protection values, and the voltage required by the first load may further include: determining, in response to determination that the two half-bus voltages are both greater than the overvoltage protection values, the control amount of the two half-bus voltages to be a difference value derived by subtracting the first half-bus voltage from the second half-bus voltage.

It can be understood that when the two half-bus voltages are both greater than the overvoltage protection values, the control amount of the half-bus voltages is determined to be the difference value derived by subtracting the first half-bus voltage from the second half-bus voltage, and control may be performed based on the midpoint balance of the first half-bus voltage and the second half-bus voltage.

Figure 7:
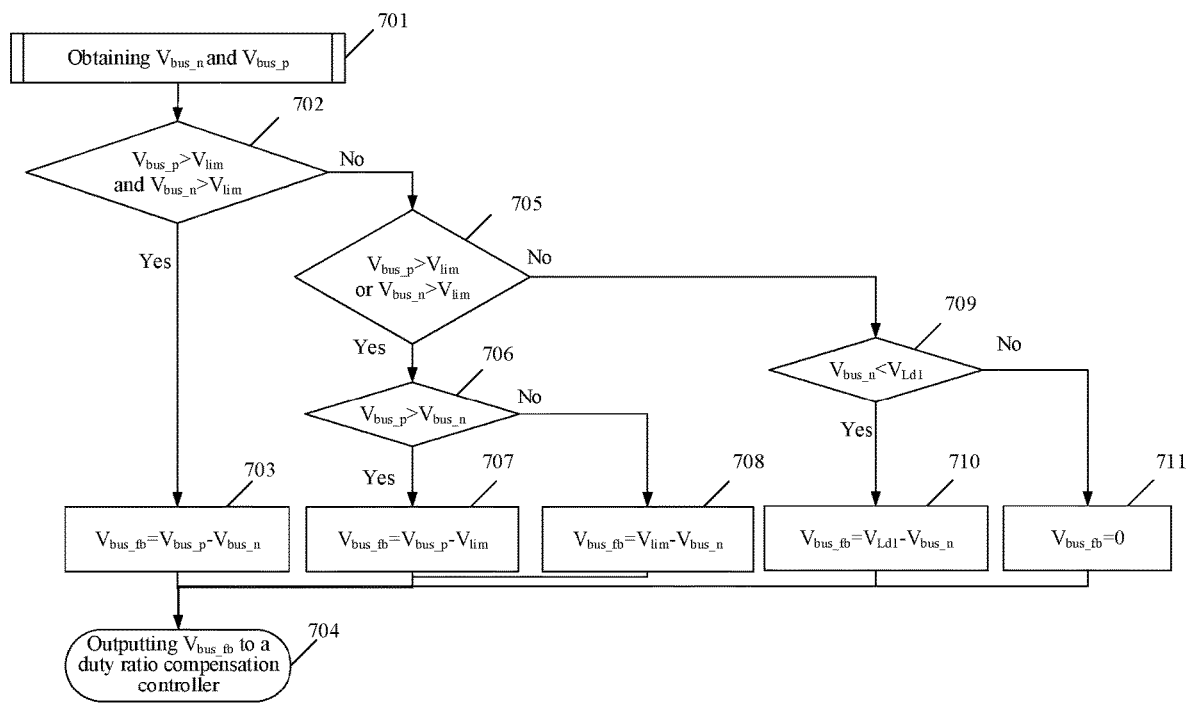
FIG. 7 is a flowchart of determining a control amount of half-bus voltages according to an embodiment of the present disclosure.

FIG. 7 is a flowchart of determining a control amount of half-bus voltages according to an embodiment of the present disclosure. As illustrated in FIG. 7, the process may include actions at processes 701 to 711.

At process 701, $V_{bus\_n}$ and $V_{bus\_p}$ are obtained.

In this embodiment of the present disclosure, $V_{bus\_n}$ represents the first half-bus voltage, and $V_{bus\_p}$ represents the second half-bus voltage.

At process 702, it is determined whether $V_{bus\_n}$ and $V_{bus\_p}$ are both greater than $V_{lim}$. When $V_{bus\_n}$ and $V_{bus\_p}$ are both greater than $V_{lim}$, process 703 is performed; and when at least one of $V_{bus\_n}$ and $V_{bus\_p}$ is smaller than or equal to $V_{lim}$, process 705 is performed.

In this embodiment of the present disclosure, $V_{lim}$ represents the overvoltage protection value.

At process 703, it is determined that $V_{bus\_fb}=V_{bus\_p}-V_{bus\_n}$.

In this embodiment of the present disclosure, when $V_{bus\_n}$ and $V_{bus\_p}$ are both greater than the overvoltage protection value $V_{lim}$, the control amount $V_{bus\_fb}$ of the half-bus voltages is determined to be a difference value derived by subtracting $V_{bus\_n}$ from $V_{bus\_p}$.

At process 704, $V_{bus\_fb}$ is outputted to the duty ratio compensation controller.

At process 705, it is determined whether $V_{bus\_n}$ is greater than $V_{lim}$ or $V_{bus\_p}$ is greater than $V_{lim}$. When $V_{bus\_n}$ is greater than $V_{lim}$ or $V_{bus\_p}$ is greater than $V_{lim}$, process 706 is performed; and when $V_{bus\_n}$ is smaller than or equal to $V_{lim}$ or $V_{bus\_p}$ is smaller than or equal to $V_{lim}$, process 709 is performed.

At process 706, it is determined whether $V_{bus\_p}$ is greater than $V_{bus\_n}$. When $V_{bus\_p}$ is greater than $V_{bus\_n}$, process 707 is performed; and when $V_{bus\_p}$ is smaller than or equal to $V_{bus\_n}$, process 708 is performed.

At process 707, it is determined that $V_{bus\_fb}=V_{bus\_p}-V_{lim}$, and process 704 is performed.

At process 708, it is determined that $V_{bus\_fb}=V_{lim}-V_{bus\_n}$, and process 704 is performed.

At process 709, it is determined whether $V_{bus\_n}$ is smaller than $V_{Ld1}$. When $V_{bus\_n}$ is smaller than $V_{Ld1}$, process 710 is performed; and when $V_{bus\_n}$ is greater than or equal to $V_{Ld1}$, process 711 is performed.

In this embodiment of the present disclosure, $V_{Ld1}$ represents the voltage required by the first load.

At process 710, it is determined that $V_{bus\_fb} \, V_{Ld1}-V_{bus\_n}$, and process 704 is performed.

At process 711, it is determined that $V_{bus\_fb}=0$, and process 704 is performed.

A program instruction corresponding to a voltage control method in the embodiments may be stored on a storage medium, such as an optical disk, a hard disk, and a USB disk. When a program instruction on the storage medium that corresponds to a voltage control method is read or executed by a control device, any one of the voltage control methods of the previous embodiments is realized.

Figure 8:
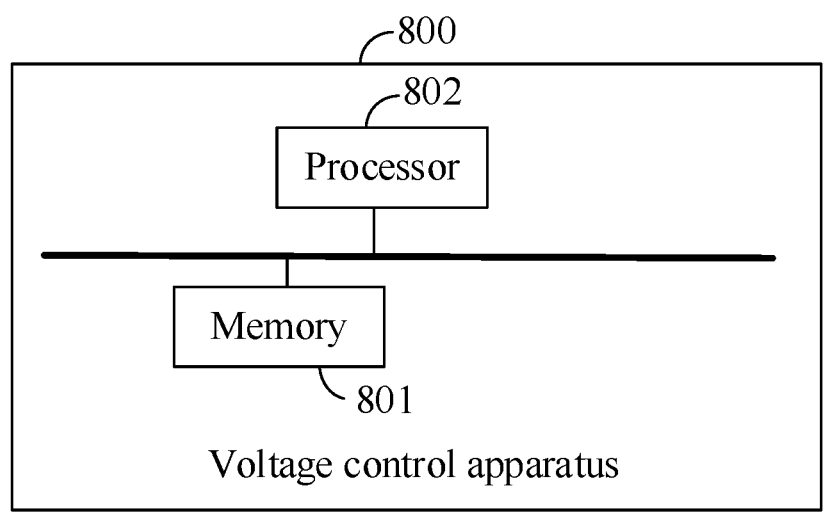
FIG. 8 is a schematic structural diagram of a voltage control apparatus according to an embodiment of the present disclosure.

Based on the same technical concept of the foregoing embodiments, FIG. 8 is a schematic structural diagram of a voltage control apparatus according to an embodiment of the present disclosure. Referring to FIG. 8, the voltage control apparatus 800 includes a memory 801 and a processor 802. The memory 801 is configured to store a computer program and data. The processor 802 is configured to execute the computer program stored on the memory to implement the voltage control method according to any one of the foregoing embodiments.

In practical applications, the memory 801 may be a volatile memory (such as RAM), a non-volatile memory (such as ROM, a flash memory, a hard disk drive (HDD), or a solid-state drive (SSD)), or a combination of the above types of memories, and provides instructions and data to the processor 802.

The processor 802 may be at least one of ASIC, DSP, DSPD, PLD, FPGA, CPU, a controller, a microcontroller, or a microprocessor. It is to be understood that different augmented reality cloud platforms may employ other electronic devices for implementing the above functions of the processor, and the type of the processor is not specifically limited in the embodiment of the present disclosure.

The embodiments of the present disclosure further provide a household device including the voltage control apparatus 800 and a second load. The voltage control apparatus is accessed between an alternating-current power supply signal and the second load, and is configured to control the alternating-current power supply signal to supply power to the second load.

In an embodiment, the second load may be the same as the first load, or may be a load of a full-bus voltage.

In an embodiment, the functions or modules included in the apparatus of the embodiments of the present disclosure may be used to perform the method described in the above method embodiments. The specific implementation thereof may refer to the description of the above method embodiments, and details thereof will be omitted herein for conciseness.

The above description of various embodiments tends to emphasize differences among the embodiments, while their similarities or commonalities can be mutually referenced. For brevity, details thereof will be omitted herein.

The features disclosed in the method embodiments of the present disclosure can be combined arbitrarily without confliction to obtain a new method embodiment.

The features disclosed in the product embodiments of the present disclosure can be combined arbitrarily without conflict to obtain a new product embodiment.

The features disclosed in the method or device embodiments of the present disclosure can be combined arbitrarily without confliction to obtain a new method embodiment or a new device embodiment.

In several embodiments provided by the present disclosure, it should be understood that the disclosed device and method may be implemented in other ways. The device embodiments described above are merely illustrative. For example, the units are merely divided based on logic functions, and may be divided in other ways in actual implementation. For example, a plurality of units or components may be combined or may be integrated into another system, or some features may be ignored or not be executed. In addition, the mutual coupling or direct coupling or communication connection between the various components illustrated or discussed may be a direct coupling or communication connection via some interfaces, devices, or units, and may be an electrical, mechanical, or other forms.

The units described as separate parts may be or not be physically separated. Parts illustrated as units may be or not be physical units. That is, the parts may be located in a position, or may be distributed on a plurality of network units. Some or all of the units may be selected as desired to achieve the objects of solutions of the embodiments.

In addition, all the functional units in the embodiments of the present disclosure may be integrated into one processing unit, or each of the respective units may be one separate unit, or two or more units may be integrated into one unit. The above integrated unit may be implemented in the form of hardware, or in the form of a combination of hardware and software functional units.

Those skilled in the art could understand that all or part of the steps of the foregoing method embodiments may be implemented by a program instruction-related hardware. The above program may be stored on a computer-readable storage medium. The program implements, when executed, the steps in the above method embodiments.

The above description merely illustrates specific implementations of the present disclosure, and the scope of the present disclosure is not limited thereto. Any change or replacement easily envisaged by those skilled in the art within the technical scope disclosed by the present disclosure should fall within the scope of the present disclosure. Therefore, the scope of the present disclosure is defined only by the claims.

INDUSTRIAL APPLICABILITY

Embodiments of the present disclosure provide a voltage control method and apparatus, a household device, a computer storage medium, and a computer program. The voltage control method includes: obtaining two half-bus voltages at a direct current side of the three-level converter, overvoltage protection values of the two half-bus voltages, and a voltage required by a first load, the first load representing a load of which a supply voltage is one of the two half-bus voltages; determining a voltage control strategy based on a relationship among the two half-bus voltages, the overvoltage protection values, and the voltage required by the first load, wherein the voltage control strategy is used to compensate for an output duty ratio of each of switches of the three-level converter, allowing a first half-bus voltage of the two half-bus voltages to be greater than or equal to the voltage required by the first load and allowing each of the two half-bus voltages to be smaller than or equal to the overvoltage protection value, and the first half-bus voltage represents a half-bus voltage for supplying power to the first load; and performing voltage control on the two half-bus voltages based on the voltage control strategy. The above solutions can improve the current harmonics and enhance the stability of the PFC circuit.

What is claimed is:

1. A voltage control method comprising:
    obtaining two half-bus voltages at a direct current side of a three-level converter, overvoltage protection values of the two half-bus voltages, and a load voltage required by a load, one of the two half-bus voltages being configured to supply voltage to the load;
    determining a voltage control strategy based on a relationship among the two half-bus voltages, the overvoltage protection values, and the load voltage, the voltage control strategy being configured to compensate for an output duty ratio of a switch of the three-level converter, such that the one of the two half-bus voltages is greater than or equal to the load voltage and each of the two half-bus voltages is smaller than or equal to a corresponding one of the overvoltage protection values; and
    performing voltage control on the two half-bus voltages based on the voltage control strategy.

2. The voltage control method according to claim 1, wherein determining the voltage control strategy includes:
    determining a compensation amount based on the relationship; and
    compensating for a current output duty ratio of the switch with the compensation amount.

3. The voltage control method according to claim 2, wherein determining the compensation amount includes:
    determining a control amount for the two half-bus voltages based on the relationship; and
    obtaining the compensation amount by performing proportional integral (PI) control on the control amount.

4. The voltage control method according to claim 3, wherein determining the control amount includes:
    obtaining a determination result by determining, in response to each of the two half-bus voltages being smaller than or equal to the corresponding one of the overvoltage protection values, a magnitude relationship between the one of the two half-bus voltages and the load voltage; and
    determining the control amount based on the determination result.

5. The voltage control method according to claim 4, wherein determining the control amount based on the determination result includes:
    determining, in response to the one of the two half-bus voltages being smaller than the load voltage, the control amount be a difference value obtained by subtracting the one of the two half-bus voltages from the load voltage; and determining, in response to the one of the two half-bus voltages being greater than or equal to the load voltage required by the first load, the control amount to be zero.

6. The voltage control method according to claim 4, wherein determining the control amount further includes:
determining, in response to the one of the two half-bus voltages being smaller than or equal to the corresponding overvoltage protection value and another one of the two half-bus voltages being greater than the corresponding overvoltage protection value, the control amount to be a difference value obtained by subtracting the overvoltage protection value corresponding to the another one of the two half-bus voltages from the another one of the two half-bus voltages.

7. The voltage control method according to claim 4, wherein determining the control amount further includes:
determining, in response to the one of the two half-bus voltages being greater than the corresponding overvoltage protection value and another one of the two half-bus voltages being smaller than or equal to the corresponding overvoltage protection value, the control amount to be a difference value obtained by subtracting the one of the two half-bus voltages from the overvoltage protection value corresponding to the one of the two half-bus voltages.

8. The voltage control method according to claim 4, wherein determining the control amount further includes:
determining, in response to the two half-bus voltages being both greater than the corresponding overvoltage protection values, the control amount to be a difference value obtained by subtracting the one of the two half-bus voltages from another one of the two half-bus voltages.

9. The voltage control method according to claim 1, wherein the overvoltage protection values are smaller than or equal to a withstand voltage value of a capacitor at the direct current side of the three-level converter.

10. A voltage control apparatus comprising:
a memory storing a computer program; and
a processor configured to execute the program to:
obtain two half-bus voltages at a direct current side of a three-level converter, overvoltage protection values of the two half-bus voltages, and a load voltage required by a load, one of the two half-bus voltages being configured to supply voltage to the load;
determine a voltage control strategy based on a relationship among the two half-bus voltages, the overvoltage protection values, and the load voltage, the voltage control strategy being configured to compensate for an output duty ratio of a switch of the three-level converter, such that the one of the two half-bus voltages is greater than or equal to the load voltage and each of the two half-bus voltages is smaller than or equal to a corresponding one of the overvoltage protection values; and
perform voltage control on the two half-bus voltages based on the voltage control strategy.

11. The voltage control apparatus according to claim 10, wherein the processor is further configured to execute the program to:
determine a compensation amount based on the relationship; and
compensate for a current output duty ratio of the switch with the compensation amount.

12. The voltage control apparatus according to claim 11, wherein the processor is further configured to execute the program to:

determine a control amount for the two half-bus voltages based on the relationship; and
obtain the compensation amount by performing proportional integral (PI) control on the control amount.

13. The voltage control apparatus according to claim 12, wherein the processor is further configured to execute the program to:
obtain a determination result by determining, in response to each of the two half-bus voltages being smaller than or equal to the corresponding one of the overvoltage protection values, a magnitude relationship between the one of the two half-bus voltages and the load voltage; and
determine the control amount based on the determination result.

14. The voltage control apparatus according to claim 13, wherein the processor is further configured to execute the program to:
determine, in response to the one of the two half-bus voltages being smaller than the load voltage, the control amount be a difference value obtained by subtracting the one of the two half-bus voltages from the load voltage; and
determine, in response to the one of the two half-bus voltages being greater than or equal to the load voltage required by the first load, the control amount to be zero.

15. The voltage control apparatus according to claim 13, wherein the processor is further configured to execute the program to:
determine, in response to the one of the two half-bus voltages being smaller than or equal to the corresponding overvoltage protection value and another one of the two half-bus voltages being greater than the corresponding overvoltage protection value, the control amount to be a difference value obtained by subtracting the overvoltage protection value corresponding to the another one of the two half-bus voltages from the another one of the two half-bus voltages.

16. The voltage control apparatus according to claim 13, wherein the processor is further configured to execute the program to:
determine, in response to the one of the two half-bus voltages being greater than the corresponding overvoltage protection value and another one of the two half-bus voltages being smaller than or equal to the corresponding overvoltage protection value, the control amount to be a difference value obtained by subtracting the one of the two half-bus voltages from the overvoltage protection value corresponding to the one of the two half-bus voltages.

17. The voltage control apparatus according to claim 13, wherein the processor is further configured to execute the program to:
determine, in response to the two half-bus voltages being both greater than the corresponding overvoltage protection values, the control amount to be a difference value obtained by subtracting the one of the two half-bus voltages from another one of the two half-bus voltages.

18. The voltage control apparatus according to claim 10, wherein the overvoltage protection values are smaller than or equal to a withstand voltage value of a capacitor at the direct current side of the three-level converter.

19. A household device comprising:
the voltage control apparatus according to claim 10, the load being a first load; and
a second load, wherein the voltage control apparatus is coupled between an alternating-current power supply signal and the second load, and is configured to control the alternating-current power supply signal to supply power to the second load.

20. A non-transitory computer storage medium storing at least one program that, when executed by at least one processor, causes the at least one processor to:

obtain two half-bus voltages at a direct current side of a three-level converter, overvoltage protection values of the two half-bus voltages, and a load voltage required by a load, one of the two half-bus voltages being configured to supply voltage to the load;

determine a voltage control strategy based on a relationship among the two half-bus voltages, the overvoltage protection values, and the load voltage, the voltage control strategy being configured to compensate for an output duty ratio of a switch of the three-level converter, such that the one of the two half-bus voltages is greater than or equal to the load voltage and each of the two half-bus voltages is smaller than or equal to a corresponding one of the overvoltage protection values; and perform voltage control on the two half-bus voltages based on the voltage control strategy.

\* \* \* \* \*